(No Model.)
G. W. HALL.
TRACE SUPPORT.
No. 284,843. Patented Sept. 11, 1883.
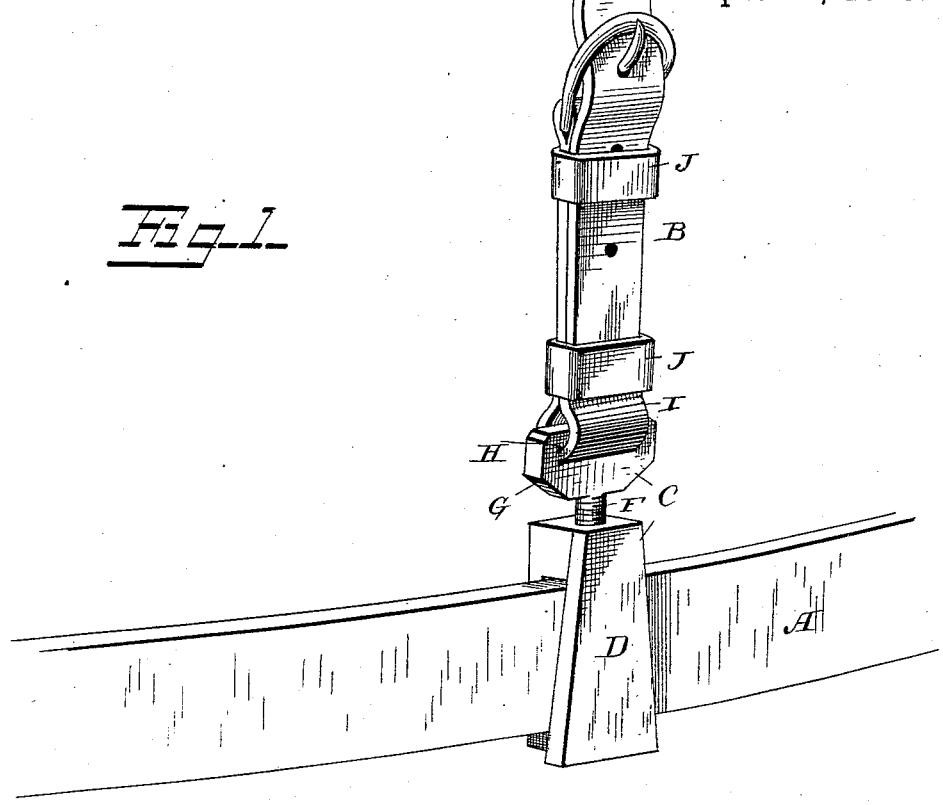
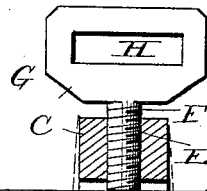
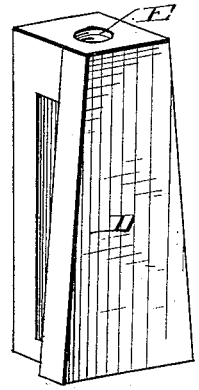
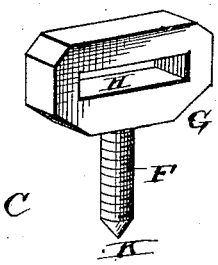
WITNESSES
F. L. Ourand
E. G. Siggers.
G. W. Hall,
INVENTOR
by C. A. Snow & Co.
Attorneys

UNITED STATES PATENT OFFICE.

GEORGE WILLIAM HALL, OF NORA SPRINGS, IOWA.

TRACE-SUPPORT.

SPECIFICATION forming part of Letters Patent No. 284,843, dated September 11, 1883.

Application filed June 21, 1883. (No model.)

*To all whom it may concern:*

Be it known that I, GEORGE W. HALL, a citizen of the United States, residing at Nora Springs, in the county of Floyd and State of Iowa, have invented a new and useful Trace-Support, of which the following is a specification, reference being had to the accompanying drawings.

This invention relates to harness trace-supports, and is more especially adapted for use at the ends of the hip-straps to form a connection between the same and the trace.

The object of the invention is to provide a device possessing superior advantages in point of simplicity, inexpensiveness, durability, and general efficiency, that will serve not only to support the trace, but to retain it securely in relative position with the hip-straps.

In the drawings, Figure 1 is a perspective view of a portion of my improved harness with the support in position. Fig. 2 is a sectional view through the trace and support. Fig. 3 is a detail perspective view of the support detached.

Referring to the drawings, A designates the trace, and B is the hip-strap, both of which parts can be of any ordinary construction. C is the support, which is preferably constructed of metal, and comprises a main loop, D, preferably rectangular in form, through which the trace is adapted to pass, having a screw-threaded perforation, E, in its top side, into which screws the corresponding shank, F, of a screw-plate, G, having an eye, H, in its head, in which the end of the hip-strap is accommodated. The hip-strap is passed through this eye, and is then brought up and buckled to itself, thus forming an end loop, I, on which are preferably arranged adjustable loops J, by which the loop may be caused to tightly encircle the screw-head, to better retain the hip-strap in position. The screw-shank F is provided with a point, K, which, when the parts are adjusted together, will enter the top edge of the trace, as shown in Fig. 2 of the drawings, and retain the trace from longitudinal displacement in the support.

The advantages and operation of my invention will be readily understood and appreciated.

By use of this improved support the trace is securely held in its relative position to the hip-strap, and cannot become displaced in handling the harness, and when the horse is unhitched the traces will be supported from the ground, as the hip-strap cannot slide forward, and there will be no necessity of providing trace-carriers to support the trace when the animal is unhitched.

I am aware that collars arranged to encircle a rope and provided with a screw-threaded neck, and having a ring and screw-threaded shank working through the said neck, is old, and I therefore do not claim this.

I claim as my invention—

The herein-described improved trace-support, comprising the rectangular loop D, provided with the screw-threaded perforation E in its top wall, and with the rectangular perforation to neatly receive the trace, the screw-plate G, having the rectangular cross-eye H to receive the corresponding hip-strap, the screw-threaded shank F, carrying the plate G and working through the perforation E, to engage the top edge of the trace to retain it securely from displacement or sliding in loop D, and the hip-strap B, passing through the eye H, substantially as and for the purpose set forth.

In testimony that I claim the foregoing as my own I have hereto affixed my signature in presence of two witnesses.

GEORGE WILLIAM HALL.

Witnesses:
A. W. BURGESS,
W. W. WILCOX.